(12) United States Patent
Betz et al.

(10) Patent No.: US 9,096,191 B2
(45) Date of Patent: Aug. 4, 2015

(54) BELT TENSIONER FOR A SAFETY BELT SYSTEM

(71) Applicant: TRW Automotive GmbH, Alfdorf (DE)

(72) Inventors: Hans-Peter Betz, Bobingen (DE); Dominik Seitzer, Schwaebisch Gmuend (DE); Karl Ruediger, Weilheim (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 14/352,076

(22) PCT Filed: Oct. 22, 2012

(86) PCT No.: PCT/EP2012/004411
§ 371 (c)(1),
(2) Date: Apr. 16, 2014

(87) PCT Pub. No.: WO2013/060436
PCT Pub. Date: May 2, 2013

(65) Prior Publication Data
US 2015/0028652 A1 Jan. 29, 2015

(30) Foreign Application Priority Data
Oct. 27, 2011 (DE) .......................... 10 2011 117 056

(51) Int. Cl.
*B60R 22/195* (2006.01)
*B60R 22/46* (2006.01)

(52) U.S. Cl.
CPC ........... *B60R 22/195* (2013.01); *B60R 22/1952* (2013.01); *B60R 22/1955* (2013.01); *B60R 22/46* (2013.01); *B60R 22/4619* (2013.01); *B60R 22/4633* (2013.01); *B60R 2022/4695* (2013.01)

(58) Field of Classification Search
CPC . F15B 15/19; B60R 22/4628; B60R 22/4633; B60R 22/4619; B60R 22/195; B60R 22/1954; B60R 22/1955; B60R 22/1952; B60R 2022/4642; B60R 2022/4647
USPC ..................... 280/806; 297/480; 60/632, 637
See application file for complete search history.

(56) References Cited

U.S. PATENT DOCUMENTS

| 5,411,291 | A | | 5/1995 | Fohl | |
|---|---|---|---|---|---|
| 5,671,949 | A | * | 9/1997 | Bauer et al. | 280/806 |
| 5,799,977 | A | | 9/1998 | Miyazaki et al. | |
| 5,944,350 | A | * | 8/1999 | Grabowski et al. | 280/806 |

(Continued)

FOREIGN PATENT DOCUMENTS

| DE | 4307062 | 9/1994 |
|---|---|---|
| DE | 10033 566 | 2/2001 |
| DE | 102004032063 | 1/2006 |

(Continued)

*Primary Examiner* — Ruth Ilan
(74) *Attorney, Agent, or Firm* — Tarolli, Sundheim, Covell & Tummino LLP

(57) ABSTRACT

The invention relates a belt tensioner (10) for a seat belt system comprising a tensioner tube (42) for receiving and guiding a pressurizing element (44) as well as a separate generator housing (46) for receiving a gas generator (48), wherein a coupling element (50) tightly connecting the generator housing (46) to the tensioner tube (42) is provided.

10 Claims, 6 Drawing Sheets

(56) References Cited

U.S. PATENT DOCUMENTS

| | | |
|---|---|---|
| 7,832,768 B2 * | 11/2010 | Singer et al. .................. 280/806 |
| 2003/0122362 A1 * | 7/2003 | Ukita et al. ................... 280/806 |
| 2009/0096202 A1 * | 4/2009 | Kohama ....................... 280/807 |
| 2010/0037610 A1 | 2/2010 | Singer |
| 2011/0068614 A1 * | 3/2011 | Sugiyama et al. ............ 297/480 |

FOREIGN PATENT DOCUMENTS

| | | |
|---|---|---|
| DE | 102005050426 | 3/2007 |
| GB | 2 262 700 A * | 6/1993 |
| WO | 96/00157 | 1/1996 |
| WO | 98/34817 | 8/1998 |
| WO | 99/25590 | 5/1999 |

* cited by examiner

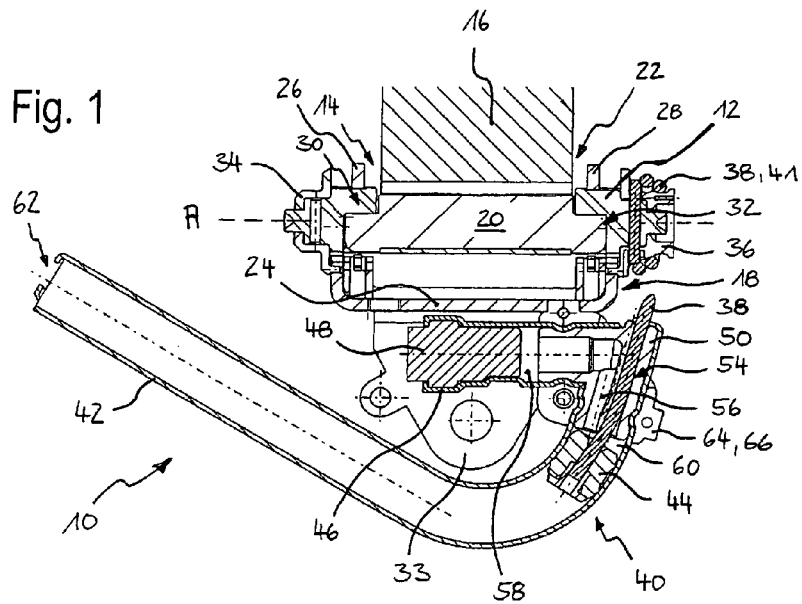

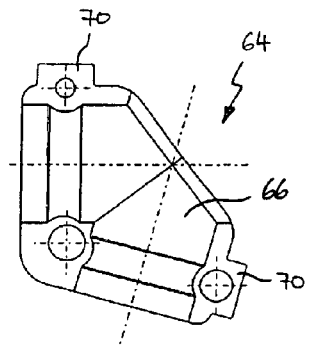
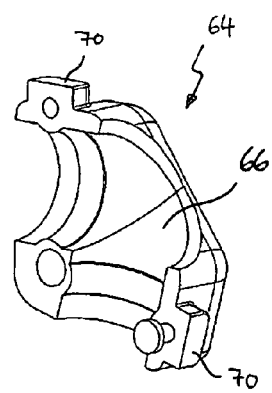
Fig. 9  Fig. 10
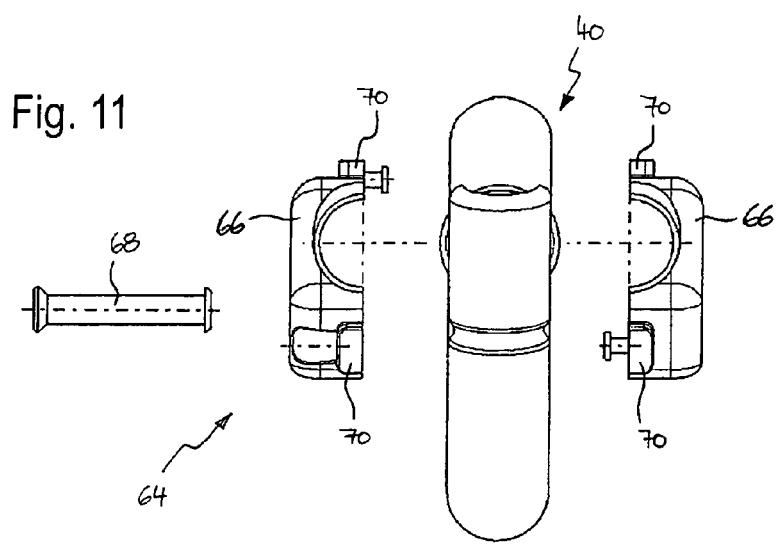
Fig. 11

BELT TENSIONER FOR A SAFETY BELT SYSTEM

RELATED APPLICATIONS

This application corresponds to PCT/EP2012/004411, filed Oct. 22, 2012, which claims the benefit of German Application No. 10 2011 117 056.5, filed Oct. 27, 2011, the subject matter, of which are incorporated herein by reference in their entirety.

BACKGROUND OF THE INVENTION

The invention relates to a belt tensioner for seat belt systems in vehicles, especially an end fitting tensioner.

Belt tensioners for seat belt systems are generally known already from automotive engineering. In so-called end fitting tensioners in the case of activation of the belt tensioner the actually fixed end of a webbing usually connected to the seat frame or the vehicle body is tightened in order to provide for tensioning of the entire webbing. In the state of the art both linearly operating as well as rotatory end fitting tensioners are described. In the rotatory end fitting tensioners the webbing end is connected to a belt shaft which is driven upon activation of the belt tensioner so as to wind webbing onto the belt shaft.

For driving the belt shaft in the tensioning direction, usually a gas generator is provided for generating a gas pressure after being triggered and thus displacing a piston in a cylindrical tensioner tube along the tubular axis. The piston is connected to the belt shaft by a pull rope, for instance, so that the belt shaft is driven in the tensioning direction and belt webbing is wound onto the belt shaft.

In the state of the art, the housing for the gas generator is e.g. a cast part which has to be rather large due to its strength properties and requires comparatively expensive manufacture.

Alternatively, for example DE 10 2005 050 426 B3 as well as DE 10 2004 032 063 B4 describe rotatory belt tensioners in which a one-part bent tube is provided which simultaneously serves as tensioner tube and generator housing. The bent tube has to receive the gas generator in an accurately fitting manner, form an as tight guide as possible for the piston and the pull rope and include a gas flow passage between the generator housing and the tensioner tube. In order to achieve said different objects and functions in a satisfactory manner, narrow set tolerances have to be observed so that the manufacture of such tube is linked with considerable manufacturing efforts.

SUMMARY OF THE INVENTION

It is the object of the invention to provide a belt tensioner, especially an end fitting tensioner, which can be manufactured in a compact design at low costs.

In accordance with the invention, this object is achieved by a belt tensioner for a seat belt system comprising a tensioner tube for receiving and guiding a pressurizing element as well as a separate generator housing for accommodating a gas generator, wherein a coupling element is provided which tightly connects the generator housing to the tensioner tube. The coupling element preferably in the form of a fitting part permits simple connection of the generator housing to the tensioner tube. Compared to the design of the tensioner tube and the generator housing as a one-part bent tube, the manufacturing costs for the belt tensioner are considerably reduced, as the afore-mentioned requirements can be distributed to various component parts. It is imaginable, for instance, that the generator housing forms an accurately fitting acceptance for the gas generator, the tensioner tube provides a largely tight acceptance and guide for the pressurizing element and the coupling element ensures a largely tight guide of the force transmission element in the form of a pull rope, for example.

Of preference, the generator housing is a simple tube length. Vis-à-vis a cast part, such tube length has clear advantages regarding the strength properties and moreover can be easily fastened to the tensioner tube by means of the coupling element. Accordingly, the tube length allows for material saving and thus lighter and compacter design of the belt tensioner. For example, each of the generator housing and the tensioner tube is made of a metal tube, especially a steel tube.

In an embodiment of the belt tensioner, the coupling element extends both into the generator housing and into the tensioner tube. Thus preferably a positive, accurately fitting and (gas) tight connection is formed between the coupling element and the generator housing as well as between the coupling element and the tensioner tube.

Especially preferred, the generator housing and the tensioner tube substantially enclose the entire coupling element. In this case, the coupling element can simply rest on the stable tensioner tube or generator housing, when internal pressure is applied, and need not be designed for the enormous internal pressure forces. This permits manufacture of the coupling element of a less strong material such as plastic material.

In order to make a fast and as gas-tight connection as possible the coupling element can be pressed with the generator housing and/or with the tensioner tube. Such pressed connection can be realized at low costs by simple tube deformation.

In an embodiment of the belt tensioner the coupling element is made of plastic material which plastic material may be reinforced with fibers, especially glass fibers or carbon fibers, where appropriate. Such coupling elements of plastic material can be manufactured in a simple and inexpensive manner for instance by injection molding.

The coupling element in this embodiment of the belt tensioner is preferably a two-component injection molded part having integrated sealing elements. Compared to a simple injection molded part, in this way with minimum extra effort a definitely improved sealing to the generator housing, to the tensioner tube and/or to the force transmission element can be realized.

For the rest, the coupling element preferably includes a flow passage communicating a pressure chamber of the generator housing to a pressure chamber of the tensioner tube.

In a further embodiment of the belt tensioner a pull rope is provided which extends through a rope guiding passage formed in the coupling element. Usually said pull rope is fastened, on the one hand, inside the tensioner tube on the pressurizing element and, on the other hand, outside the tensioner tube on a rope reel, the rope reel being connected to the belt shaft in a rotationally fixed manner. Designing the rope guiding passage is possible at minimum costs especially in the case of a coupling element made of plastic material. When the coupling element is manufactured as a two-component injection molded part, moreover also good sealing effect between the rope guiding passage and the pull rope can be achieved.

In another embodiment of the belt tensioner a stabilizing unit is provided for fixing the connection between the generator housing and the tensioner tube. The stabilizing unit comprises, for example, two stabilizing elements of cast material, especially of zinc die cast, connected by a fastener, for instance a tubular rivet. Said stabilizing unit fixes the generator housing, the tensioner tube and of preference also a belt shaft housing relative to each other at a desired predefined position.

The belt tensioner may especially be an end fitting tensioner, comprising a belt shaft to which one end of a belt webbing is fixed and a belt shaft housing in which the belt shaft is supported, wherein the belt shaft can be rotated upon activation of the belt tensioner relative to the belt shaft housing so as to wind up webbing.

BRIEF DESCRIPTION OF THE DRAWINGS

Further features and advantages of the invention are evident from the following description in a preferred embodiment with reference to the drawings, in which:

FIG. 1 shows an axial longitudinal section across a belt tensioner according to the invention;

FIG. 2 is a top view of the belt tensioner according to FIG. 1;

FIG. 9 is a side view of a stabilizing element of the belt tensioner according to FIGS. 1 to 4;

FIG. 10 is a perspective view of the stabilizing element according to FIG. 9;

FIG. 11 is an exploded view of a stabilizing unit of the belt tensioner according to FIGS. 1 to 4;

DESCRIPTION OF EMBODIMENTS

Figure 3:
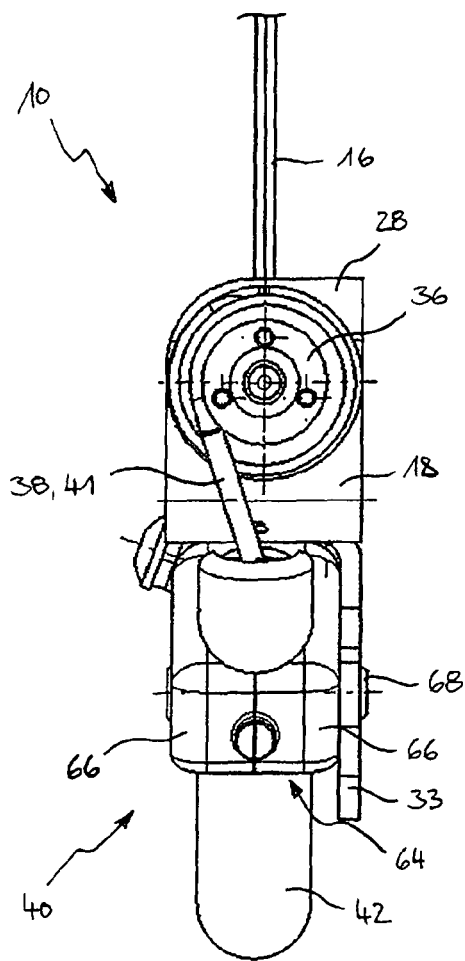
FIG. 3 is a side view of the belt tensioner according to FIG. 1.

FIGS. 1 to 4 show a belt tensioner 10 for a seat belt system in a vehicle, concretely speaking a so called end fitting tensioner, comprising a belt shaft 12 at which one end 14 of a webbing 16 is fixed and a belt shaft housing 18 adapted to be fixedly mounted on the body in which the belt shaft 12 is supported, wherein the belt shaft 12 can be rotated relative to the belt shaft housing 18 after activation of the belt tensioner 10 so as to wind up webbing 16.

In the shown embodiment, the end 14 of the webbing 16 is stitched to form a loop enclosing a belt shaft inserting element 20, wherein the belt shaft inserting element 20 is received in a recess 22 of the belt shaft 12 and is supported relative to the belt shaft 12 in a rotationally fixed manner.

According to FIG. 2, the belt shaft housing 18 of the belt tensioner 10 is U-shaped and comprises a housing land 24 as well as two opposite housing legs 26, 28, each housing leg 26, 28 having a housing aperture 30, 32 through which the belt shaft 12 extends. Furthermore, a securing strap 33 bent from the housing land 24 is provided through which the belt shaft housing 18 can be tightly connected, especially screwed, to a vehicle seat or a vehicle body.

The belt shaft 12 is pivoted about an axis A in the belt shaft housing 18. At the axial ends of the belt shaft 12 an end cover 34 and, resp., a rope reel 36 are disposed, the end cover 34 and the rope reel 36 being tightly connected to, especially pressed with the belt shaft 12 and preventing axial movement of the belt shaft 12 relative to the belt shaft housing 18 or limiting the same to minimum axial play.

In order to be able to tighten the webbing 16 upon activation of the belt tensioner 10 a force transmission element 38 is provided for coupling the belt shaft 12 to a tensioner drive 40. In the illustrated embodiment, the force transmission element 38 is a pull rope 41 being partly wound on the rope reel 36 and fastened by one rope end to the rope reel 36.

The tensioner drive 40 of the belt tensioner 10 comprises a tensioner tube 42 for receiving and guiding a pressurizing element 44 as well as a separate generator housing 46 for receiving a gas generator 48. According to FIG. 1, the pressurizing element 44 is a piston which is substantially sealed in the bent tensioner tube 42 and is accommodated to be movable along a tubular axis. The pull rope 41 fixed by one rope end to the rope reel 36 extends from the rope reel 36 into the tensioner tube 42 and is fastened there to the piston by an opposite rope end. Upon activation of the gas generator 48, gas pressure is applied to the piston and the piston moves in the direction of a free tube end 62 of the tensioner tube 42. While the belt shaft 12 rotates, pull rope 41 is unwound from the rope reel 36 and at the same time webbing 16 is wound onto the belt shaft 12 so that belt tensioning takes place.

In the shown embodiment of the belt tensioner 10 the tensioner drive 40 has an especially advantageous design which shall be illustrated hereinafter by way of FIGS. 5 to 8.

Figure 5:
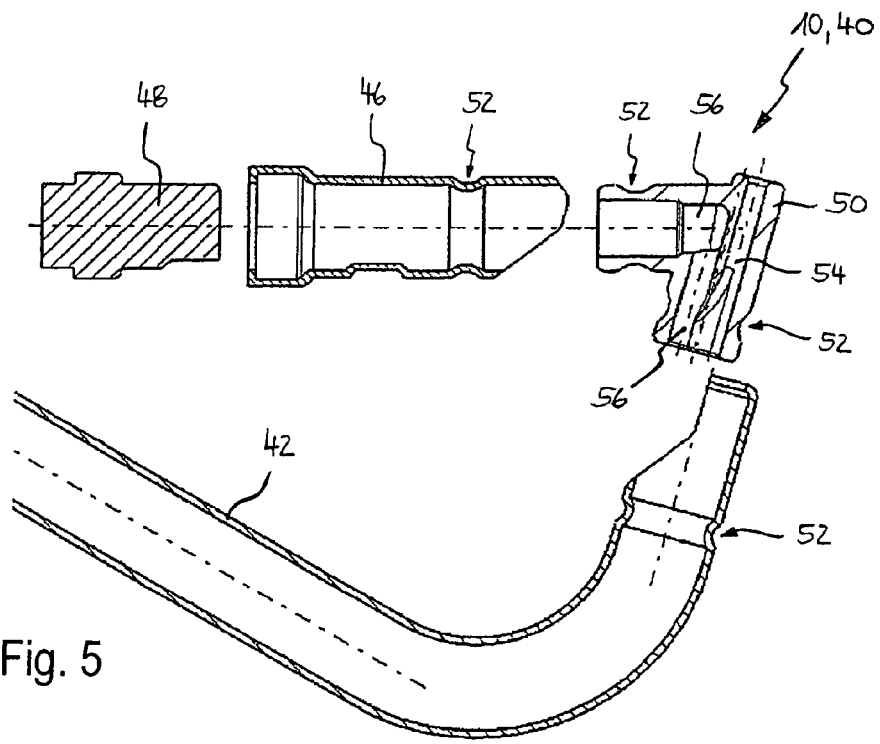
FIG. 5 shows a section across a tensioner drive of the belt tensioner according to FIGS. 1 to 4 in an exploded view.
Figure 6:
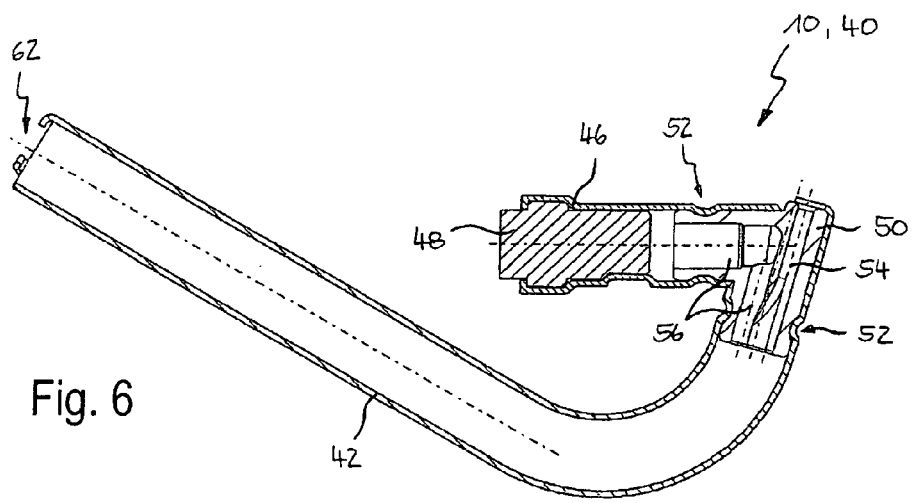
FIG. 6 shows a section across the tensioner drive according to FIG. 5 in the assembled state.

FIGS. 5 and 6 illustrate sectional drawings of the tensioner drive 40, wherein in FIG. 5 an exploded view of the individual components and in FIG. 6 the assembled state of the tensioner drive 40 is evident.

In the shown embodiment the generator housing 46 is a tube length so that both the tensioner tube 42 and the generator housing 46 are made of a metal tube, especially a steel tube.

Moreover, one can clearly take from the sectional drawings that a coupling element 50 is provided for tightly connecting the generator housing 46 to the tensioner tube 42. According to FIG. 6, the coupling element 50 extends both into the generator housing 46 and into the tensioner tube 42 so as to form an accurately fitting, positive and largely tight connection.

A positive, accurately fitting and especially gas-tight connection between the coupling element 50, on the one hand, and the tensioner tube 42 as well as the generator housing 46, on the other hand, can be most simply realized in that the coupling element 50 is pressed with the generator housing 46 and with the tensioner tube 42. For this purpose, for example in the coupling element 50 circumferential beads 52 are preformed (cf. FIG. 5). The pressed connections then can be made with little effort by simple tube deformations and they are clearly visible in FIG. 6 by way of the circumferential beads 52.

Figure 7:
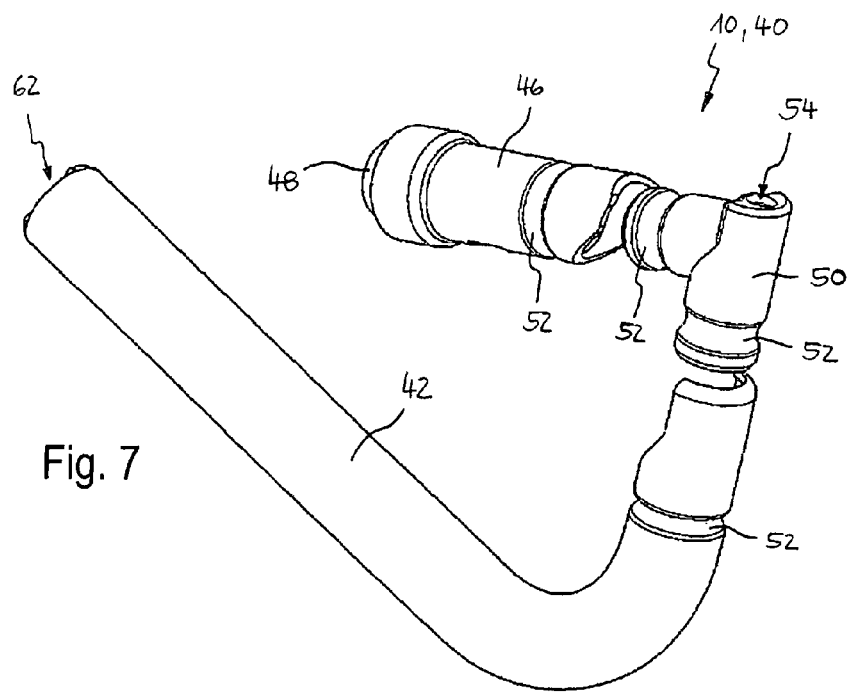
FIG. 7 shows a perspective exploded view of the tensioner drive according to FIG. 5.
Figure 8:
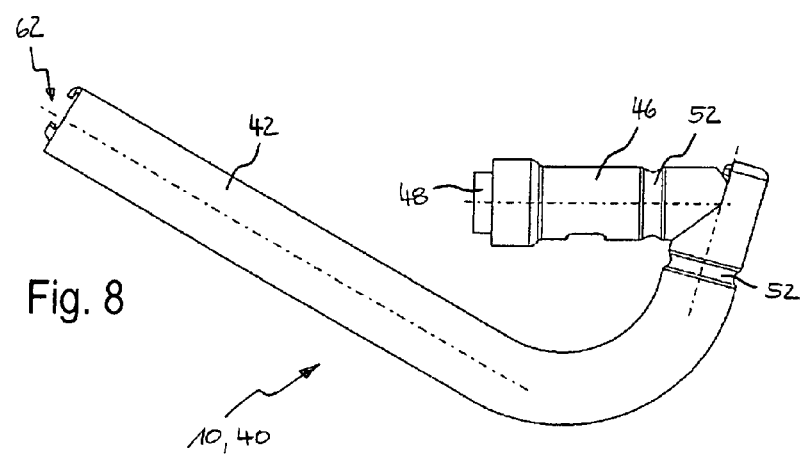
FIG. 8 is a view of the tensioner drive according to FIG. 7 in the assembled state.

FIGS. 7 and 8 show two views of the tensioner drive 40 in an exploded view as well as in the assembled state. Especially in FIGS. 6 and 8 it is clearly evident that the generator housing 46 and the tensioner tube 42 enclose substantially the whole coupling element 50. By this almost complete accommodation in the generator housing 46 configured as a metal tube, the coupling element 50 need not be designed for the high gas pressure loads after activation of the belt tensioner 10, but it can simply rest on the stable metal tubes which are adapted to easily absorb the occurring pressure loads.

Therefore the coupling element 50 can be manufactured in a simple and inexpensive manner of plastic material, possibly a fiber-reinforced plastic material. In order to improve the sealing to the tubes, i.e. to the tubular generator housing 46 and to the tensioner tube 42 as well as to the force transmission element 38 in the form of the pull rope 41, the coupling element 50 in particular is a two-component injection molded part having integrated sealing elements.

In the coupling element 50 a rope guiding passage 54 is formed through which the force transmission element 38 configured as a pull rope extends.

Furthermore, the coupling element 50 also includes a flow passage 56 which communicates a pressure chamber 58 of the generator housing 46 to a pressure chamber 60 of the tensioner tube 42. Via said flow passage 56 the pressure gas released by the gas generator 48 flows from the pressure chamber 58 of the generator housing 46 into the pressure chamber 60 of the tensioner tube 42 and displaces the pressurizing element 44 along the tensioner tube 42 toward the free tube end 62 (cf. also FIG. 1).

In order to secure and to reinforce a rigid connection of the generator housing 46 and the tensioner tube 42 as well as to provide a simple connection between the tensioner drive 40 and the belt shaft housing 18, furthermore a stabilizing unit 64 is provided which shall be discussed in detail hereinafter by way of FIGS. 9 to 13.

FIGS. 9 and 10 show a stabilizing element 66 of the stabilizing unit 64 in a side view as well a perspective view. The stabilizing element 66 is a cast part, especially made of zinc die cast.

Figure 4:
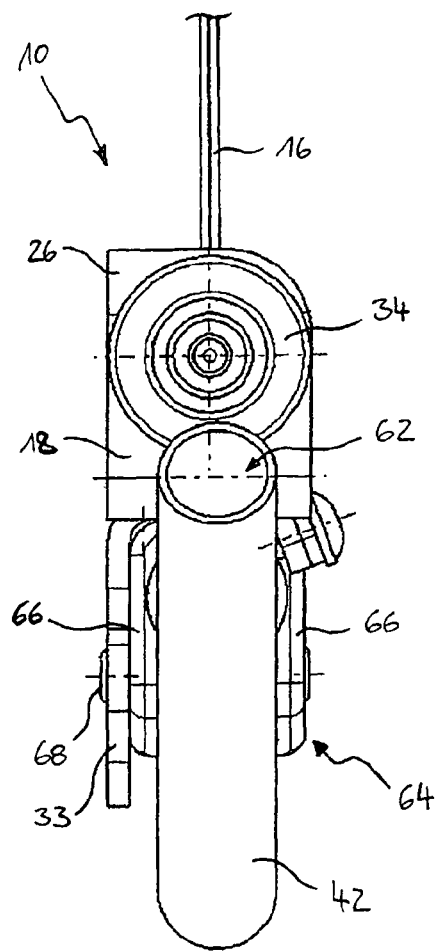
FIG. 4 is another side view of the belt tensioner according to FIG. 1.

In accordance with FIG. 11, the stabilizing unit 64 comprises two respective stabilizing elements 66 as well as a fastener 68, for example a tubular rivet for fastening the stabilizing elements 66 to each other and to the belt shaft housing 18, more exactly speaking to the securing strap 33 of the belt shaft housing 18 (cf. also FIGS. 3 and 4).

Figure 12:
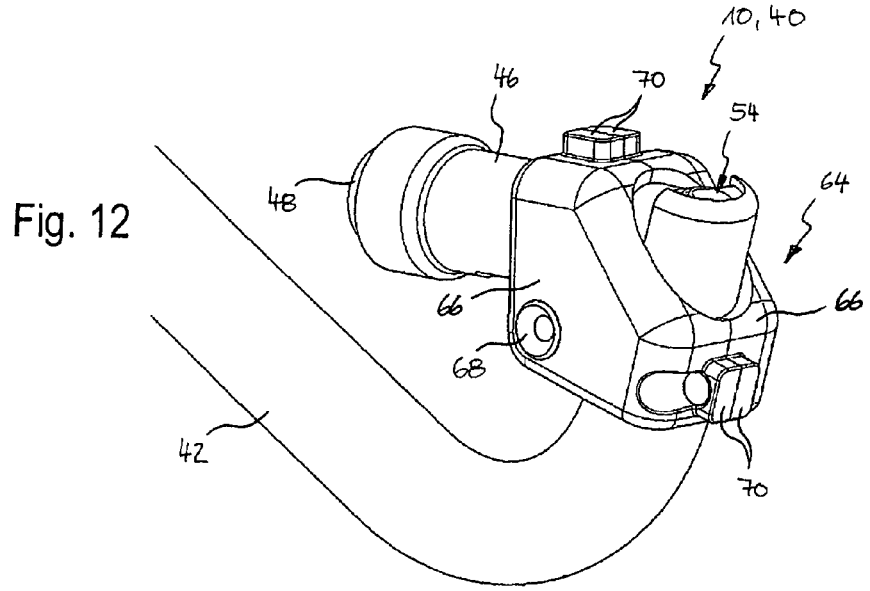
FIG. 12 is a perspective view of the stabilizing unit according to FIG. 11 in the assembled state.

In the assembled state according to FIG. 12, the stabilizing elements 66 surround the tensioner tube 66 and the generator housing 46 in the connecting area thereof according to the type of a sleeve which fixes the position of the generator housing relative to the tensioner tube 42.

Figure 13:
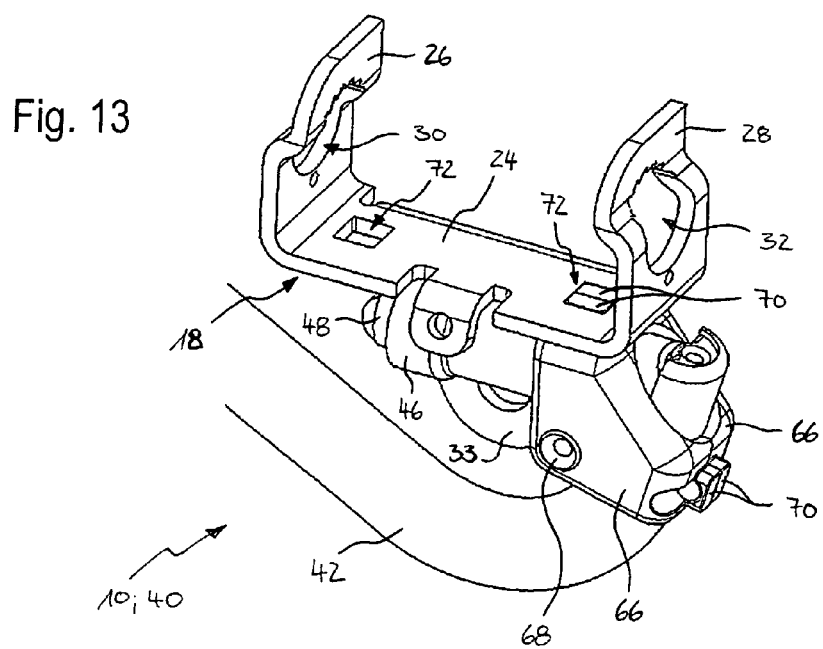
FIG. 13 is a perspective view of the stabilizing unit according to FIG. 12 having an attached belt shaft housing.

Moreover, at the stabilizing unit 64, concretely speaking at each of the stabilizing elements 66, positioning projections 70 are provided which can engage accurately fittingly in a recess 72 of the belt shaft housing 18 in order to fix the belt shaft housing 18 at a desired position relative to the tensioner drive 40. This is shown in FIG. 13. For the rest, further the symmetric configuration of the belt shaft housing 18 and the stabilizing unit 64, concretely speaking the stabilizing elements 66 of the stabilizing unit 64, is referred to, whereby both a belt tensioner 10 for the driver side and a (mirror-inverted) belt tensioner 10 for the passenger side of a vehicle can be assembled with identical components.

In total, in the present case the tensioner drive 40 of the belt tensioner 10 can be manufactured in a very compact manner at minimum costs. Mainly the two-part design of the generator housing 46 and the tensioner tube 42 as well as the simple and inexpensive connection by means of the coupling element 50 contributes to this. An especially inexpensive and compact embodiment of the tensioner drive 40 and thus of the belt tensioner 10 is resulting when both the generator housing 46 and the tensioner tube 42 are made of a simple formed metal tube.

The invention claimed is:

1. A belt tensioner for a seat belt system, comprising
a tensioner tube (42) for receiving and guiding a pressurizing element (44) as well as
a separate generator housing (46) for receiving a gas generator (48),
wherein a coupling element (50) extends both into the generator housing (46) and into the tensioner tube (42) for tightly connecting the generator housing (46) to the tensioner tube (42).

2. The belt tensioner according to claim 1, wherein the generator housing (46) is a tube length.

3. The belt tensioner according to claim 1, wherein the coupling element (50) is made of plastic material.

4. The belt tensioner according to claim 1, wherein the coupling element (50) includes a flow passage (56) which communicates a pressure chamber (58) of the generator housing (46) to a pressure chamber (60) of the tensioner tube (42).

5. The belt tensioner according to claim 1, wherein a pull rope (41) extending through a rope guiding passage (54) formed in the coupling element (50) is provided.

6. The belt tensioner according to claim 1, wherein the belt tensioner (10) is an end fitting tensioner, comprising a belt shaft (12) to which one end (14) of a webbing (16) is fixed and a belt shaft housing (18) in which the belt shaft (12) is supported, wherein upon activation of the belt tensioner (10) the belt shaft (12) can be rotated relative to the belt shaft housing (18) so as to wind up webbing (16).

7. The belt tensioner according to claim 1, wherein the coupling element (50) and at least one of the tensioner tube (42) and the generator housing (46) each includes a circumferential bead (52) for tightly connecting the generator housing (46) to the tensioner tube (42).

8. A belt tensioner for a seat belt system, comprising:
a tensioner tube (42) for receiving and guiding a pressurizing element (44) as well as
a separate generator housing (46) for receiving a gas generator (48),
wherein a coupling element (50) is provided for tightly connecting the generator housing (46) to the tensioner tube (42) with the generator housing (46) and the tensioner tube (42) enclosing substantially the entire coupling element (50).

9. A belt tensioner for a seat belt system, comprising:
a tensioner tube (42) for receiving and guiding a pressurizing element (44) as well as
a separate generator housing (46) for receiving a gas generator (48),
wherein a coupling element (50) is pressed with the generator housing (46) and/or with the tensioner tube (42) for tightly connecting the generator housing (46) to the tensioner tube (42).

10. A belt tensioner for a seat belt system, comprising:
a tensioner tube (42) for receiving and guiding a pressurizing element (44) as well as
a separate generator housing (46) for receiving a gas generator (48),
a coupling element (50) for tightly connecting the generator housing (46) to the tensioner tube (42), and
a stabilizing unit (64) which fixes the connection between the generator housing (46) and the tensioner tube (42).

* * * * *